May 31, 1938.  F. KURZ  2,119,015
POLYPHASE WATTHOUR METER CONSTRUCTION
Filed March 6, 1937

Inventor:
Fred Kurz
By: Brown, Jackson, Boettcher + Dienner,
Attys.

Patented May 31, 1938

2,119,015

UNITED STATES PATENT OFFICE 2,119,015

POLYPHASE WATTHOUR METER CONSTRUCTION

Fred Kurz, Springfield, Ill., assignor to Sangamo Electric Company, Springfield, Ill., a corporation of Illinois Application March 6, 1937, Serial No. 129,300

7 Claims. (Cl. 171—264)

My invention relates, generally, to watthour meters and it has particular relation to means for adjusting the torque applied by an induction watthour meter element to a meter disc.

It is desirable to provide for adjusting the torque that is applied by an induction watthour meter element to its meter disc in order to provide the desired operating characteristics. Since it is not practical to manufacture induction watthour meter elements so that they will be exactly identical and, further, since it is not feasible to mount them in identical relations in the meters, it is necessary to provide some means for adjusting the torque that is applied by one or more elements to the meter disc.

When two induction watthour meter elements are arranged to cooperate with a single disc, the torques applied by these two elements must be balanced so that under identical operating conditions, each will apply the same torque to the disc. Thus, one or both of the elements should be provided with adjusting means that will permit the torque to be adjusted for obtaining the desired operating characteristics.

Accordingly, the object of my invention, generally stated, is to provide adjusting means for adjusting the torque of an induction watthour meter element that shall be simple and efficient in operation and which may be readily and economically manufactured and installed.

An important object of my invention is to provide for adjusting the torque of an induction watthour meter element by shunting a portion of the flux generated thereby that threads the meter disc.

Another important object of my invention is to provide for adjusting the torque of an induction watthour meter element through the operation of a single adjusting means.

A more specific object of my invention is to provide for variably bridging the open ends of the E-shaped core of the voltage electromagnet of an induction watthour meter by commonly shunting the outer legs thereof with the middle leg.

Still another object of my invention is to provide for holding the adjusting means in any position to which it may be operated.

A still further object of my invention is to provide for adjusting the torques that are applied by two induction watthour meter elements to a single disc.

Other objects of my invention will, in part, be obvious and in part appear hereinafter.

My invention is disclosed in the embodiment hereof shown in the accompanying drawing and it comprises the features of construction, combination of elements and arrangement of parts that will be exemplified in the construction hereinafter set forth and the scope of the application of which will be indicated in the appended claims.

For a more complete understanding of the nature and scope of my invention reference may be had to the following detailed description taken in connection with the accompanying drawing in which.

Figure 1:
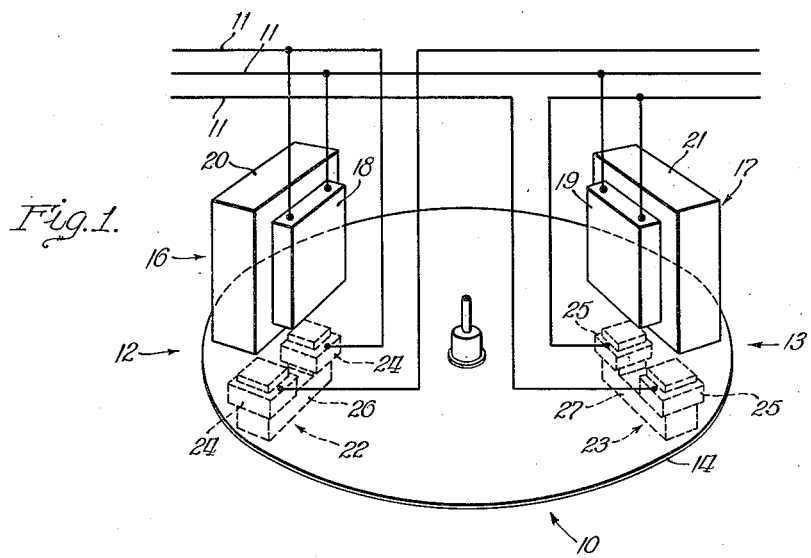
Figure 1 illustrates diagrammatically the arrangement of two induction watthour meter elements arranged to drive a single disc and the electrical connections therefor.

Referring now particularly to Figure 1 of the drawing, it will be observed that the reference character 10 designates, generally, an induction watthour meter that is arranged to be connected to conductors 11 which may form a part of a single phase, three wire system or a three phase system as the case may be. The meter 10 is provided with two induction watthour meter elements shown generally at 12 and 13, both of which are arranged to apply driving torque to a disc 14. It will be understood that the disc 14 drives a register, in the usual manner, for integrating the power flowing through the conductors 11. Since the construction and operation of the register mechanism is well known to those skilled in the art, a detailed description thereof will not be set forth herein.

The elements 12 and 13 are identical insofar as manufacturing operations will permit them to be so. Each of the elements 12 and 13 is provided with voltage electromagnets 16 and 17, respectively, having windings 18 and 19 that are mounted on E-shaped laminated cores 20 and 21. The windings 18 and 19 are connected across the conductors 11 as indicated in order to provide the desired voltage connections. The elements 12 and 13 are also provided with current electromagnets 22 and 23, respectively. Each of these electromagnets is provided with current windings 24 and 25, respectively, that are mounted on C-shaped laminated cores. The current windings 24 and 25 are connected in series circuit relation with certain of the conductors 11 as illustrated. The cores 20 and 26 and 21 and 27 are disposed above and below the disc 14 and with the ends in close proximity thereto for driving it.

Figure 2:
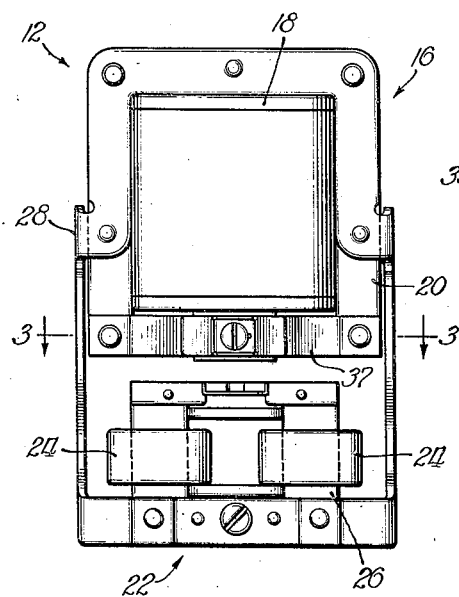
Figure 2 is a view, in front elevation, of one of the induction watthour meter elements.

Since the elements 12 and 13 are identical in construction, it is necessary to describe in detail the construction of only one of them. This is more clearly shown in Figure 2 of the drawing where it will be observed that the cores 20 and 26 of the voltage and current electromagnets 16 and 22, respectively, are secured on a frame 28 that is suitably shaped for carrying them in the desired spaced relation. The voltage winding 18 is positioned on the middle leg of the core 20 while the current windings 24 are disposed around the arms of the C-shaped core 26.

Figure 3:
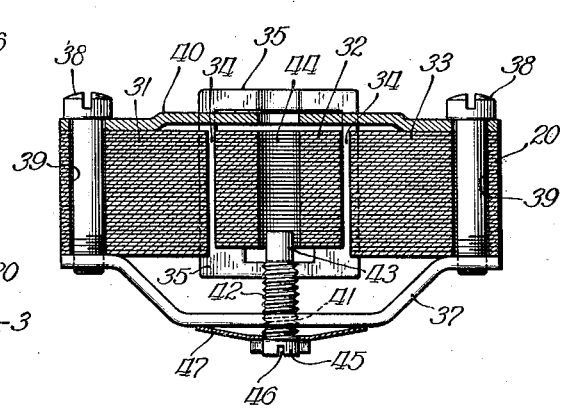
Figure 3 is a detail sectional view taken generally along the line 3—3 of Figure 2 to show more clearly the construction and manner of operation of my improved adjusting means.

As indicated hereinbefore, it is desirable to provide for adjusting the torque of one or both of the elements 12 or 13 in order that the proper operating characteristics of the meter may be provided. The arrangement and construction of the means for effecting this adjusting feature are shown more clearly in Figure 3 of the drawing. As there illustrated the ends 31, 32 and 33 of the legs of the E-shaped core 20 adjacent the disc 14 are spaced apart to provide air gaps 34 therebetween. It will be understood that the flux which is effective in applying torque to the disc 14 is that portion of the flux which flows from the outer legs 31 and 33 to the inner leg 32 and threads the disc 14. By adjusting the amount of flux flowing between these legs, it is possible to adjust the torque that is applied for driving the disc 14.

The customary lag loop 35 is provided around the middle leg 32 in order to provide the desired flux relationships as will be readily understood.

In order to adjust the flux that threads the disc 14 for varying the torque of the element, a magnetic shunt member 37 in the form of a strip of high permeability magnetic material is bent to the shape shown and secured to the core 20 by screws 38 that extend through transverse apertures 39 therein. It will be observed that the magnetic shunt member 37 is non-adjustably fastened to the outer legs 31 and 33 and that, once it is assembled on the elements, it is not intended that it be moved. The bolts 38 extend through a suitable frame member 40 on the side of the core 20 opposite the magnetic shunt member 37.

Intermediate the ends of the magnetic shunt member 37 a threaded aperture 41 is provided for threadably mounting an adjusting screw 42 that is formed of a magnetic material having relatively high permeability. One end of the screw 42 is provided with a cylindrical portion that is arranged to move longitudinally in a transverse aperture 44 that extends through the middle leg 32 of the core 20. At its other end the screw 42 is provided with a head 45 having a slot 46 extending there across for receiving a screw-driver. A retainer clip 47 in the form of a spring strip is disposed between the magnetic shunt member 37 and the head 45 of the screw 42 in order to hold the latter in any position to which it may be adjusted.

In operation, if it is desired to increase the torque that one of the elements 12 or 13 applies to the disc 14, the screw 42 may be turned in such direction as to withdraw the cylindrical end portion 43 thereof from the aperture 44. By this adjustment less flux will be shunted around the disc 14 and more flux will thread it, thereby increasing the torque applied thereto. The torque is decreased by turning the screw 42 in such direction that the cylindrical portion 43 is moved further into the aperture 44, thereby shunting more flux from the disc 14.

When this construction is employed, it will be observed that only a single adjustment is required to effect the change in torque. That is, by adjusting the position of a single screw, for example the screw 42, it is possible to change the torque that is applied by the element. Since the magnetic shunt member 37 is securely fastened by the screws 38 to the outer legs 31 and 33 of the core 20, the screw 42 is always maintained in proper alignment with the transverse aperture 44 in the middle leg 32.

Since certain changes may be made in the foregoing construction and different embodiments of the invention may be made without departing from the scope thereof, it is intended that all matter set forth in the foregoing description or shown in the accompanying drawing shall be interpreted as illustrative and not in a limiting sense.

I claim as my invention:

1. In a polyphase induction watthour meter, in combination, a rotatable disc, a plurality of induction watthour meter elements each including a single driving unit comprising current and voltage wattmeter elements cooperating with said disc for applying torque thereto, means for adjusting the torque of at least one of said elements, and a single means for operating said adjusting means throughout its entire range of adjustment.

2. In a polyphase induction watthour meter, in combination, a rotatable disc, a plurality of induction watthour meter elements cooperating with said disc for applying torque thereto, means individual to each of said elements for adjusting its torque to balance the torques applied to said disc by said elements, and a single means individual to each of said adjusting means for operating the same throughout the entire range of adjustment.

3. In a polyphase induction watthour meter, in combination, a rotatable disc, a plurality of induction watthour meter elements each including current and voltage electromagnets arranged to apply torque to said disc, an E-shaped magnetic core forming a part of each voltage electromagnet with its open ends adjacent said disc, a magnetic shunt means interconnecting the outer legs of said core and secured thereto, and adjustable magnetic means interposed between said shunt and the middle leg of said core for adjusting the torque applied to said disc whereby the torques applied to said disc by said elements are balanced.

4. In an induction watthour meter element including current and voltage electromagnets for applying torque to a watthour meter disc, in combination, an E-shaped magnetic core forming a part of said voltage electromagnet and having its open ends adjacent said disc, magnetic shunt means interconnecting the outer legs of said core and non-adjustably fastened thereto, and adjustable magnetic means interposed between said shunt means and the middle leg of said core for adjusting the flux from said core threading said disc.

5. In an induction watthour meter element including current and voltage electromagnets for applying torque to a watthour meter disc, in combination, an E-shaped magnetic core forming a part of said voltage electromagnet and having its open ends adjacent said disc, the middle leg of said core having a transverse aperture, a magnetic shunt member interconnecting the outer legs of said core, and a bridging member formed of magnetic material and mounted on said shunt member for movement relative thereto and with respect to said aperture for adjusting the flux from said core threading said disc.

6. In an induction watthour meter element including current and voltage electromagnets for applying torque to a watthour meter disc, in combination, an E-shaped magnetic core forming a part of said voltage electromagnet and having its open ends adjacent said disc, the middle leg of said core having a centrally located transverse aperture, a shunt member in the form of a strip of magnetic material interconnecting the outer legs of said core, and a screw of magnetic material threadably mounted on said shunt member and movable into and out of said aperture for adjusting the flux from said core threading said disc.

7. In an induction watthour meter element including current and voltage electromagnets for applying torque to a watthour meter disc, in combination, an E-shaped magnetic core forming a part of said voltage electromagnet and having its open ends adjacent said disc, the middle leg of said core having a centrally located transverse aperture, a shunt member in the form of a strip of magnetic material non-adjustably fastened to the outer legs of said core and magnetically interconnecting them, said shunt member having a threaded aperture registering with said transverse aperture, and an adjusting member formed of magnetic material and threaded in said threaded aperture, said adjusting member including a cylindrical tip adapted to be moved longitudinally of said transverse aperture and in spaced relation thereto for adjusting the flux from said core threading said disc.

FRED KURZ.